United States Patent
Li (10) Patent No.: US 9,264,246 B2
(45) Date of Patent: Feb. 16, 2016

(54) SYSTEM, METHOD AND CLIENT FOR JOINING IN GROUP

(75) Inventor: Jianzhen Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 126 days.

(21) Appl. No.: 13/258,805

(22) PCT Filed: Apr. 6, 2010

(86) PCT No.: PCT/CN2010/071558
§ 371 (c)(1),
(2), (4) Date: Sep. 22, 2011

(87) PCT Pub. No.: WO2010/118664
PCT Pub. Date: Oct. 21, 2010

(65) Prior Publication Data
US 2012/0023165 A1 Jan. 26, 2012

(30) Foreign Application Priority Data
Apr. 13, 2009 (CN) .......................... 2009 1 0038580

(51) Int. Cl.
*G06F 15/16* (2006.01)
*H04L 12/18* (2006.01)

(52) U.S. Cl.
CPC .................................. *H04L 12/1822* (2013.01)

(58) Field of Classification Search
CPC ....... H04L 67/1044; H04W 4/08; G06F 15/16
USPC ................... 455/518; 709/203–206
See application file for complete search history.

(56) References Cited

U.S. PATENT DOCUMENTS

| 6,898,436 | B2 * | 5/2005 | Crockett et al. ............... 455/518 |
| 7,120,797 | B2 | 10/2006 | Wheeler |
| 8,010,602 | B2 * | 8/2011 | Shen et al. ..................... 709/204 |
| 8,140,619 | B2 * | 3/2012 | Lyle et al. ..................... 709/204 |
| 2003/0096605 | A1 | 5/2003 | Schlieben et al. |
| 2008/0183814 | A1 * | 7/2008 | Sanghavi ....................... 709/204 |
| 2009/0077124 | A1 * | 3/2009 | Spivack et al. ............. 707/103 Y |

(Continued)

FOREIGN PATENT DOCUMENTS

| CN | 101047519 A | 10/2007 |
| CN | 101150424 A | 3/2008 |

(Continued)

OTHER PUBLICATIONS

Chinese First Office Action dated Mar. 3, 2011 for Application No. 2009100385802.
International Search Report: mailed Jul. 15, 2010; PCT/CN2010/071558.

(Continued)

*Primary Examiner* — Vivek Srivastava
*Assistant Examiner* — Karina J Garcia-Ching
(74) *Attorney, Agent, or Firm* — Harness, Dickey & Pierce, P.L.C.

(57) ABSTRACT

A system, method and client for joining in a group, include: a group server receiving a recommendation request for joining in a group, and adding to the group the user being recommended to be added to the group according to the recommendation request. Adopting the system, method and client for joining in a group provided by the present invention, the user's operation can be facilitated, thereby the user's experiences are improved.

5 Claims, 6 Drawing Sheets

(56) References Cited

U.S. PATENT DOCUMENTS

2009/0083183 A1     3/2009    Rao et al.
2013/0132854 A1*   5/2013    Raleigh et al. ................ 715/738

FOREIGN PATENT DOCUMENTS

| | | |
|---|---|---|
| CN | 101369985 A | 2/2009 |
| CN | 101534207 A | 9/2009 |
| EP | 1841160 A1 | 10/2007 |
| RU | 2325693 C2 | 5/2008 |

OTHER PUBLICATIONS

First Mexico Office Action Aug. 15, 2012; Patent. No. MX/a/2011/010788.

Second Mexico Office Action dated Feb. 18, 2013; Patent No. MX/a/2011/010788.

First Russia Office Action dated Nov. 23, 2012; Appln. No. 2011145147.

Singapore Office Action dated Jan. 24, 2013; Appln. No. 201106890-5.

* cited by examiner

SYSTEM, METHOD AND CLIENT FOR JOINING IN GROUP

FIELD OF THE INVENTION

The present invention relates to a technical filed of Instant Messaging, and more particularly, involves a system, method and client for joining in a group.

BACKGROUND OF THE INVENTION

At present, an online Instant Messenger (called "IM" for short) has become a communication tool for most of Netizens which provides terminal services for at least two persons to communicate instant text information, archives, voices and videos on line. The Instant Messenger may realize not only one-to-one information communications between two users but also group communications among multiple users through group establishment. The emergency of groups provides a communication mode of chatting among multiple persons for the Instant Messenger, and a member of a group is able to communication information with multiple other members of the group simultaneously.

A user may create a group through the Instant Messenger, invite as an administrator his friend to join in the group, and add the identifier of the friend such as the number of the friend to the membership list of the group after the friend accepts the invitation. When a user desires to join in a certain group, he may send a message that requests joining in the group to the administrator according to the identifier of the group such as the number of the group, and the identifier of the user will be added to the membership list of the group after the administrator's verification.

However, if a user who desires to invite his friend to join in a group is not the administrator of the group, he has to inform his friend of the identifier of the group, so that his friend can then join in the group through the identifier of the group. In addition, when a user is interested in and desires to join in a group regarding a certain topic such as a group with a topic of travelling, it is possible that a group to which a friend of the user belongs is in accordance with this topic while the friend can not assist the user in adding him automatically into the group. It can be seen that the method for joining in the group in the prior art is not convenient which will make the user's experiences worse.

SUMMARY OF THE INVENTION

In view of the aforementioned, the present invention provides a system for joining in a group, a method for joining in a group, and two clients, so as to facilitate the user's operations and improve the user's experiences.

To realize the above objects, the technical solutions of the present invention are implemented as follows:

A system for joining in a group, including a group server and a client communicating data with the group server, wherein, the client is to transmit a recommendation request for joining in a group to the group server; and, the group server is to add a user recommended to be added to a group to the group according to the recommendation request.

A method for joining in a group, including: receiving, by a group server, a recommendation request for joining in a group from a client; and, adding, by the group server, a user recommended to be added to the group to the group according to the recommendation request.

A client, including: a recommendation request module, a group management module and a transceiver module; wherein, the recommendation request module is to generate a request for recommending a user itself to be added to a group, and transmit the request to the transceiver module; the group management module is to transmit characters of group inputted by the user; the transceiver module is to transmit to a client of a friend the characters of group and the request for recommending the user itself to be added to the group; the transceiver module is further to receive characters of group and a request for recommending the friend itself to be added to a group from the client of the friend, and transmit the characters of group to the group management module; the group management module is further to search for a group matching to the characters of group; and, the recommendation request module is further to generate a recommendation request for joining in a group, and transmit the recommendation request, an identifier of the group searched out and an identifier of the friend to the group server.

A client, including: a recommendation request module, a group management module, a transceiver module and a friend management module; wherein, the recommendation request module is to generate a request for recommending a friend to be added to a group, and transmit the request to the transceiver module; the friend management module is to transmit an identifier of the friend selected by a user to the group management module; the group management module is to transmit an identifier of the group which the friend is recommended to be added to and the identifier of the friend to the transceiver module; the transceiver module is to transmit to the client of the friend selected by the user the request for recommending the fried to be added to the group and the identifier of the group which the friend is recommended to be added to; the transceiver module is further to receive from the client of the friend a request for recommending a friend to be added to a group and an identifier of the group which the friend is recommended to be added to, and transmit the identifier of the group to the group management module; the group management module is further to determine whether to join in the group, and notify the recommendation request module that a recommendation request for joining in the group is to be generated when it is determined to join in the group; and, the transceiver module is further to transmit to the group server the recommendation request for joining in the group, an identifier of the local user, and the identifier of the group which it is accepted to join in.

It can be seen that when the technical solutions of the present invention are adopted, the client transmits to a group server a recommendation request for joining in a group, the group server adds the user recommended to be added to the group into the group, and thus, even a user not being an administrator can add another user to the group, so that the user's operations are facilitated and the user's experiences are improved.

BRIEF DESCRIPTION OF THE DRAWINGS

Illustrative embodiments of the present invention are described hereinafter in detail in reference to accompanying drawings to make those ordinarily skilled in this field understand the aforementioned features and advantages and others more clear. In the accompanying drawings.

EMBODIMENTS OF THE INVENTION

Figure 1:
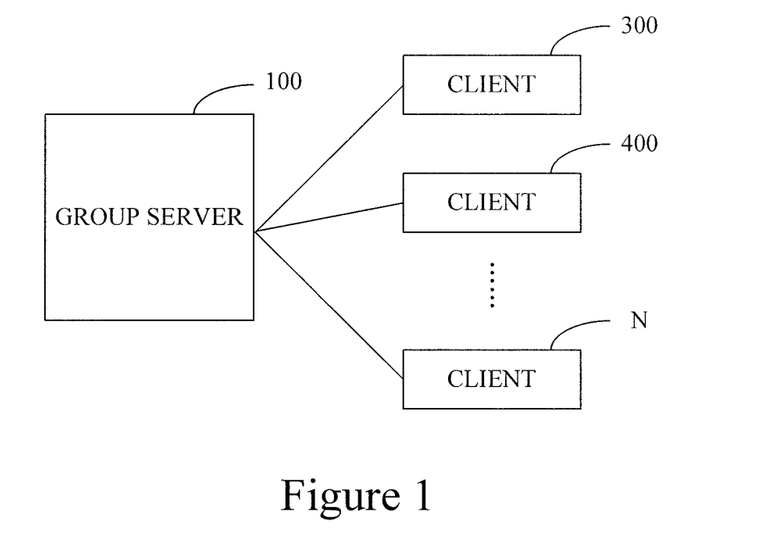
FIG. 1 is a diagram illustrating a structure of a system for joining in a group in an embodiment of the present invention.

FIG. 1 is a diagram showing a structure of a system for joining in a group in an embodiment of the present invention. As shown in FIG. 1, the system includes: a group server 100 and a plurality of clients such as client 300, client 400, . . . , client N.

The group server 100 is connected to the clients respectively, and to store each client's group data, including a membership list of a group, an administrator list of the group, an identifier of the group, and identifiers of user and etc., and to process the data according to requests from different clients and feedback results of processing.

Each client may be various terminal communication devices, e.g., a Personal Computer (PC), a Personal Digital Assistant (PDA), a Mobile Phone (MP), various Web Client (WC) or etc. In the protection scope of the present invention, the client is not limited to any particular type.

Each client may transmit a recommendation request for joining in a group to a group server 100 which will add the user recommended to be added to the group into the group according to the recommendation request for joining in the group.

In the system for joining in a group as shown in FIG. 1, the internal structure and function of each client is identical except that different users are run on different clients, and it is possible that each user has multiple friends which are respectively run on different clients. Therefore, the "user" and "friend" mentioned herein are relative concepts, and each "user" may also be a "friend" of another user.

In practical applications, the system for joining in a group shown in FIG. 1 may further include a transfer server connected with each client, and the transfer server is to store index relationship between each client's address and the user's identifier, and transfer the data, messages, instructions and the like transmitted from each client to a corresponding client according to the index relationship.

Figure 2:
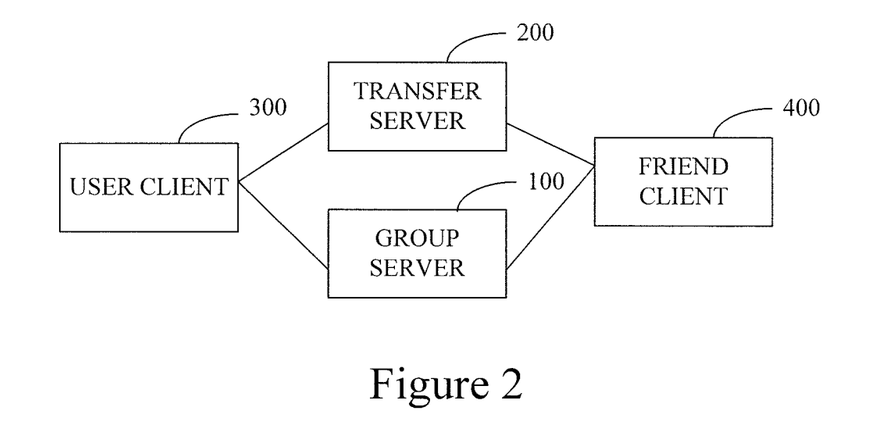
FIG. 2 is a diagram illustrating a structure of a system for joining in a group in a preferred embodiment of the present invention.

FIG. 2 is a diagram showing a structure of a system for joining in a group in a preferred embodiment of the present invention. The system is a typical one in a network environment. As shown in FIG. 2, the system includes: a group server 100, a transfer server 200, a user client 300 and a friend client 400. The user client 300 has an internal structure and functions identical with those of the friend client 400, where, there is a user logging in the user client 300 while a friend of the user logs in the friend client 400. As discussed before, the "user" and "friend" are relative concepts in the present invention.

Figure 3:
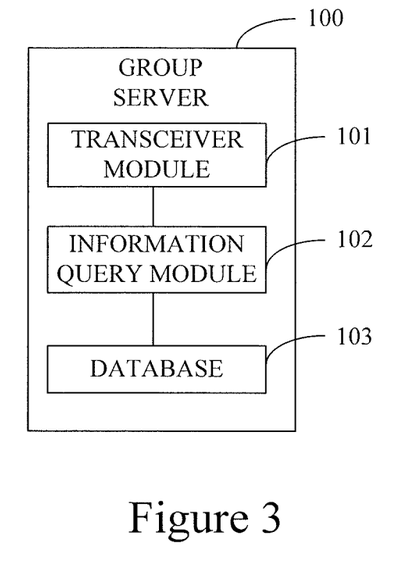
FIG. 3 is a diagram illustrating a structure of a group server in an embodiment of the present invention.

The group server 100 respectively connects to the user client 300 and the friend client 400. As shown in FIG. 3, the group server 100 includes a transceiver module 101, an information query module 102 and a database 103, wherein:

The transceiver module 101 is to accomplish transmission and receiving of messages, instructions and data, including: receiving a recommendation request for joining in a group from the user client 300 and the friend client 400, and receiving a group identifier, a user identifier or the like sent from the user client 300 and the friend client 400.

The information query module 102 is connected with the transceiver module 101 and is to query an administrator list of the group according to the received recommendation request for joining in the group.

The database 103 is connected to the query module 102, and is to store group data of the user client 300 and the friend client 400, including: user identifiers, a group identifier, a membership list of a group, an administrator list of the group and the like.

The transfer server 200 is connected with the user client 300 and the friend client 400 respectively, and is to transfer the data, messages and instructions received from each client to a corresponding client according to an index relationship between each client's address and the user identifier. Specifically, characters of a group submitted by the user client 300 are transferred to the friend client 400, an instruction of a recommendation request for joining in the group generated by the user client 300 is transferred to the friend client 400, and a processing result of the recommendation request which recommends itself to be added to the group is transferred to the user client 300.

Figure 4:
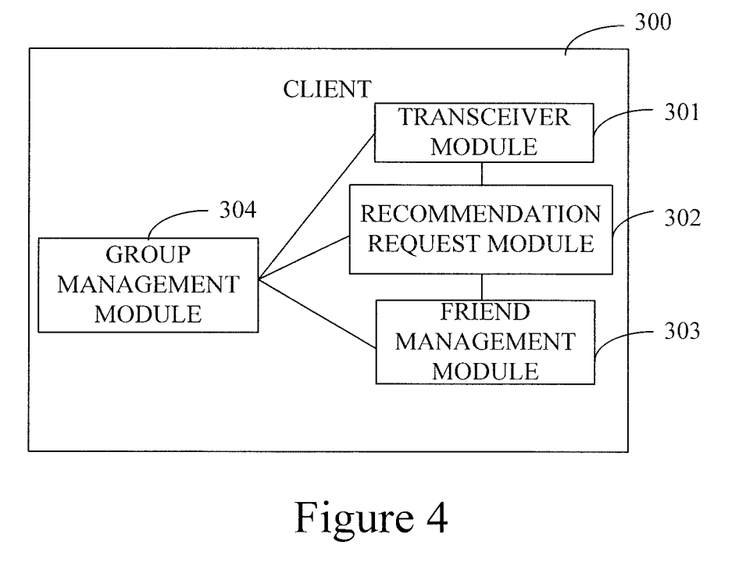
FIG. 4 is a diagram illustrating a structure of a client in an embodiment of the present invention.

The user client 300 is connected with the group server 100 and the transfer server 200 respectively. As shown in FIG. 4, the user client 300 includes a transceiver module 301, a recommendation request module 302, a friend management module 303 and a group management module 304, wherein:

The transceiver module 301 is to receive data, messages and instructions transmitted from the group server 100 and the transfer server 200, and transmit to the transfer server 200 or the group server 100 characters of a group, a request for recommending itself to be added to the group, a request for recommending a friend to be added to the group, a user identifier and a group identifier.

The recommendation request module 302 is connected with the transceiver module 301, and is to generate a recommendation request for joining in the group which includes a request for recommending a friend to be added to the group and the one for recommending itself to be added to the group.

The friend management module 303 is connected with the recommendation request module 302, and is to manage a user's friend list and submit the user identifier.

The group management module 304 is connected with the transceiver module 301, the recommendation request module 302 and the friend management module 303 respectively, and is to manage a user's group list, submit a group identifier such as a group number when transmitting a recommendation request for joining in a group, submit characters of the group when the recommendation request module 302 is generating a request for recommending itself to be added to the group, and search for a group matching the characters of the group according to the characters of the group received by the transceiver module 301.

The friend client 400 is connected with the group server 100 and the transfer server 200. As the "user" and "friend" are relative concepts, the internal structure of the friend client 400 is identical with that of the user client 300 as well as the functions of each module therein, which will not be discussed again herein.

In practical applications, the system may further include an administrator client 500 (which is not shown in any figure) connected with the group server 100, the administrator of the group is run on the administrator client 500, the internal structure as well as each module's functions of which is identical with that of the user client 300.

Upon the group server 100 receiving a recommendation request for joining in a group, the information query module 102 therein queries an administrator list of the group from the database 103 according to the recommendation request, and the transceiver module 101 transmits a recommendation request for joining in the group according to the administrator list to the administrator client 500. The transceiver module of the administrator client 500 transfers the received request to the group management module for processing. When the user as the administrator accepts the request, the administrator client 500 notifies the group server 100 that the identifier of the user being recommended to be added to the group is to be added into the membership list of the group.

Figure 5:
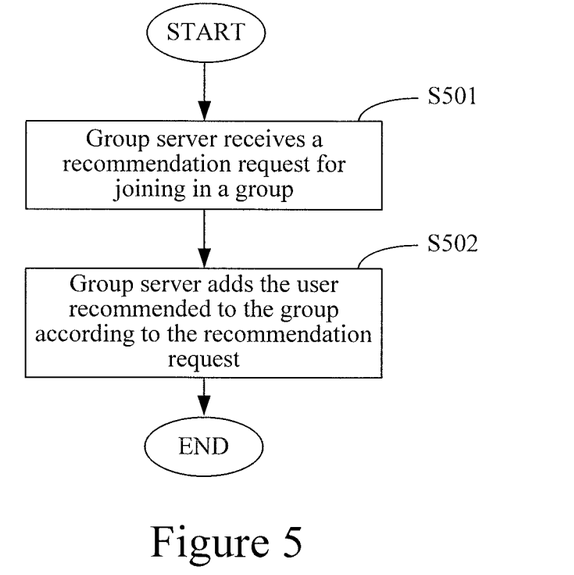
FIG. 5 is a flow chart of a method for joining in a group in an embodiment of the present invention.

FIG. 5 is a flow chart of a method for joining in a group in an embodiment of the present invention. As shown in FIG. 5, it includes the following steps:

Step S501: the group server 100 receives a recommendation request for joining in a group.

Step S502: the group server 100 adds into the group a user recommended to be added to the group according to the recommendation request.

The recommendation request for joining in a group received by the group server 100 may be generated by the friend client 400 when the friend client 400 receives the characters of the group and a request for recommending the user client itself to be added to the group sent from the user client 300, and searched out the group matching to the characters of the group according to the characters of the group. For example, the user desires to join in a group related to traveling, he inputs "I want to join in a group about traveling" in a window on the main panel of the group management module 304, the group management module 304 submits the characters of the group to the transceiver module 301, and the characters of the group is transmitted to the friend client 400 through the transceiver module 301 together with the request for recommending itself to be added to the group generated by the recommendation request module 302. The group management module of the friend client 400 searches for the matching group according the received characters of the group, notifies the recommendation request module of the friend client 400 that a request for recommending a user to be added to the group is to be generated upon the group matching to the characters is searched out, and transmits the request to the group server 100 through the transceiver module of the friend client 400.

In addition, the recommendation request for joining in a group received by the group server 100 may also be generated by the friend client 400 after the friend client 400 receives a request for recommending a friend to be added to a group from the user client 300 and has processed the request. For example, the user client 300 generates a request for recommending a friend to be added to a group through the recommendation request module 302, and selects the friend that it desires to recommend to be added to the group from the friend list through the friend management module 303, and the transceiver module 301 transmits to the friend client 400 the request for recommending the friend to be added to the group. The recommendation request module of the friend client 400 processes the received request for recommending to the friend to be added to the group, and when the friend accepts to join in the group, generates a recommendation request for joining in the group, and transmits the recommendation request to the group server 100 through the transceiver module of the friend client 400.

The above two cases will be further described in detail in the following preferred embodiments.

Figure 6:
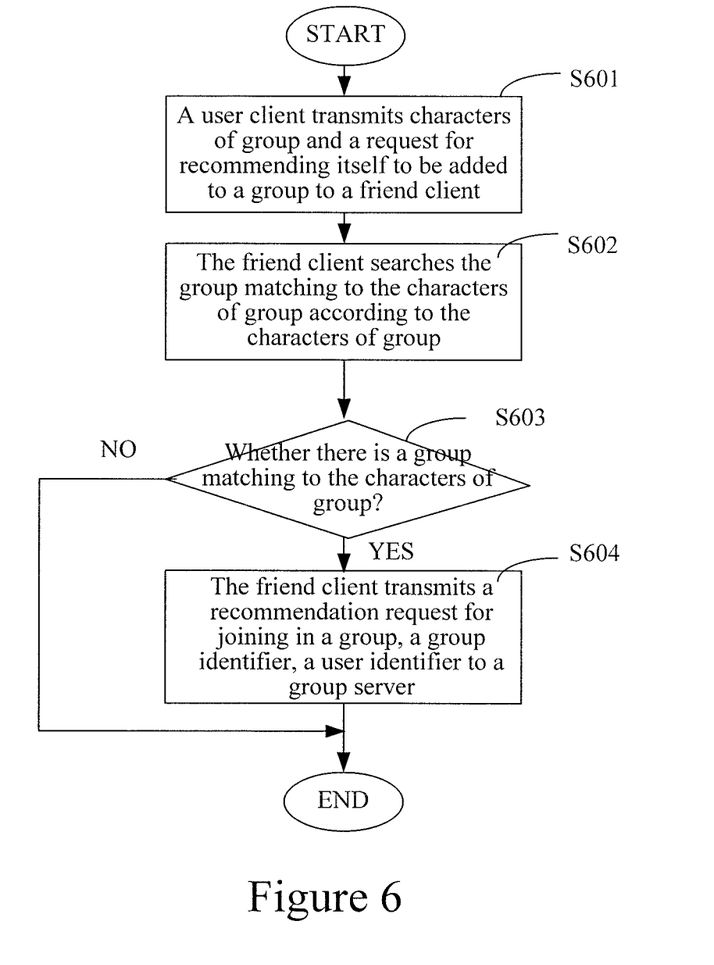
FIG. 6 is a flow chart of a method for joining in a group in a first preferred embodiment of the present invention.

FIG. 6 is a flow chart of the method for joining in a group in the first preferred embodiment of the present invention. Supposing that a user recommends itself to be added to a group in this preferred embodiment, the specific procedure is as follows:

Step S601: the user client 300 transmits to the friend client 400 characters of the group and a request for recommending the user client itself to be added to the group.

The specific implementation of this step may include: (i) the recommendation request module 302 of the user client 300 generates a request for recommending itself to be added to the group, the group management module 304 submits characters of the group inputted by the user, e.g., the user desires to recommend himself to be added to a group with a topic of traveling, he inputs "I want to join in a group about traveling" in a window on the main panel of the group management module 304, the group management module 304 obtains the characters of the group and submits them to the transceiver module 301; and (ii) the transceiver module 301 encapsulates the characters of the group as a packet, and transmits the packet to the transfer server 200 together with the request for recommending the user client itself to be added to the group, and then the packet and this request are then transferred to the friend client 400 through the transfer server 200 according to a transfer protocol.

Step S602: the friend client 400 searches for the group matching to the characters of the group according to the characters of the group.

The specific implementation of this step may include: (i) the transceiver module of the friend client receives the packet and analyzes it, discards the packet if it is analyzed that the packet is invalid, and otherwise, retrieves the characters of the group from the packet; and, (ii) the group management module of the friend client 400 searches for the group matching to the characters of the group from the group list according to the characters of the group obtained through the above analysis.

Step S603: the friend client 400 judges whether there exists a group matching to the characters of the group, and executes Step S604 if there exists it, and otherwise, the procedure is terminated.

Step S604: the friend client 400 transmits a recommendation request for joining in a group, a group identifier and a user identifier to the group server 100.

Herein, the group identifier is referred to as the identifier of the group matching to the characters of the group sent from the user client 300.

The specific implementation of this step includes: (i) the recommendation request module of the friend client 400 generates the recommendation request for joining in the group; (ii) the group management module of the friend client 400 integrates the group identifier and the user identifier (optionally, further integrates a friend identifier) and submits them to the transceiver module of the friend client 400; and, (iii) the transceiver module of the friend client 400 transmits to the group server 100 the recommendation request for joining in the group and a packet that encapsulates the group identifier and the user identifier.

Figure 7:
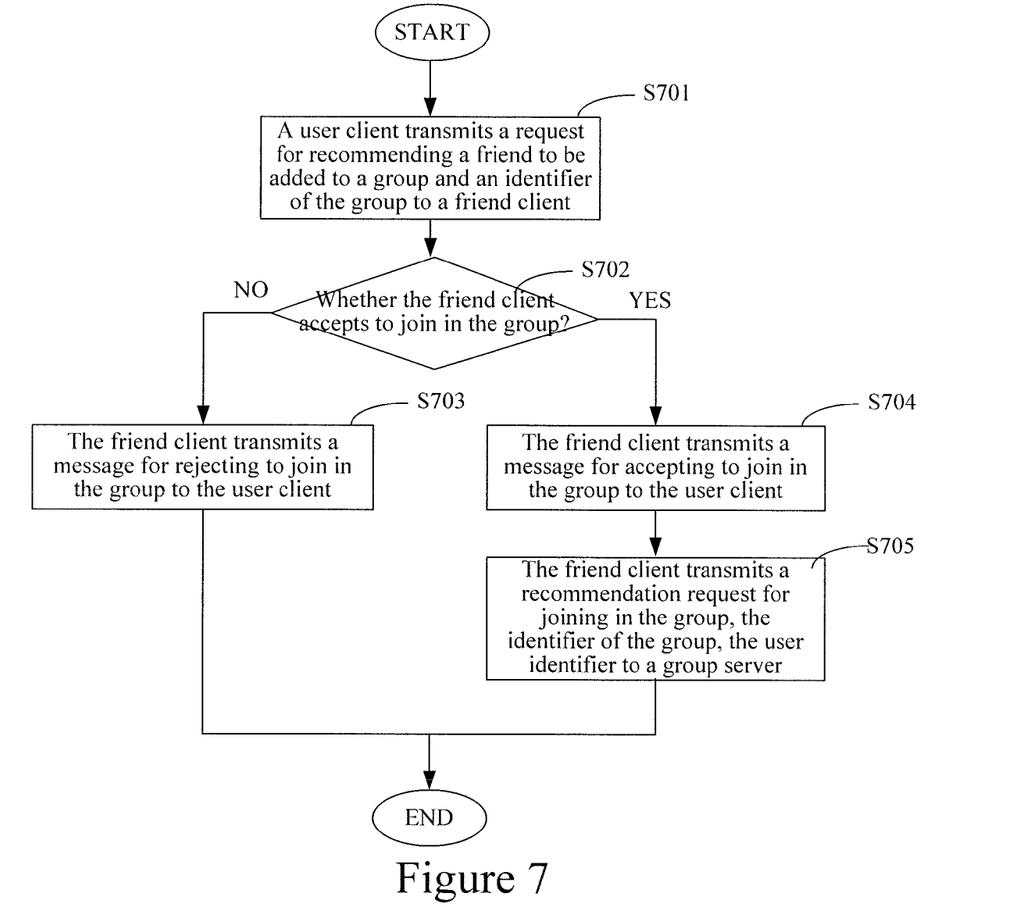
FIG. 7 is a flow chart of a method for joining in a group in a second preferred embodiment of the present invention; and, FIG. 8 is a flow chart of a method for a group server processing a recommendation request for joining in a group in an embodiment of the present invention.

FIG. 7 is a flow chart of the method for joining in a group in the second embodiment of the present invention. Supposing that a user recommends his friend to be added to the group in this preferred embodiment, the specific procedure is as follows:

Step S701: the user client 300 transmits a request for recommending a friend to be added to a group to the friend client 400.

The specific implementation of this step includes: (i) the recommendation request module 302 of the user client 300 generates the request for recommending the friend to be added to the group, and at the same time, the friend management module 303 provides the user's friend list for the user to select the friend that he desires to recommend to be added to the group and submits the friend identifier selected by the user to the group management module 304; (ii) the group management module 304 of the user client 300 encapsulates the identifier of the group which the user recommends the fried to be added to and the friend identifier into a packet and transmits the packet to the transceiver module 301; and, (iii) the transceiver module 301 transmits to the friend client 400 the packet and the request for recommending the fried to be added to the group. In practical applications, the transceiver module 301 may also transfer the above information to the fried client 400 through the transfer server 200. In this case, the fried client 400 may receive a message such as "Your friend * recommends you to join in * group".

Step S702: it is judged whether the fried client 400 accepts to join in the group, it accepts, Step S704 is executed, and otherwise, Step S703 is executed.

The specific implementation of this step includes: (i) the transceiver module of the friend client 400 receives a packet, if it is analyzed that the packet is invalid, discards it, and otherwise retrieves the group identifier from the packet which is analyzed as valid; and, (ii) the group management module of the fried client 400 provides an interface for the user to select whether to accept to join in the group, and if the user select to accept, Step S704 is executed, and otherwise, Step S703 is executed.

Step S703: the friend client 400 transmits a message for rejecting to join in the group to the user client 300.

When the friend rejects to join in the group recommended by the user, the transceiver module of the friend client 400 transmits the message for rejecting to join in the group to the user client 300. And optionally, the message may be transmitted to the transfer server 200 first and then be transferred to the user client 300 by the transfer server 200. In this case, the user client 300 may receive a message such as "Your friend * rejects to join in the * group you recommended".

Step S704: the fried client 400 transmits a message for accepting to join in the group to the user client 300.

When the fried accepts to join in the group recommended by the user, the transceiver module of the fried client 400 transmits the message for accepting to join in the group to the user client 300. In this case, the user client 300 may receives a message such as "Your friend * accepts to join in the * group you recommended".

Step S705: the fried client 400 transmits the recommendation request for joining in the group together with the group identifier and the user identifier to the group server 100.

The specific implementation of this step includes: (i) the recommendation request module of the fried client 400 generates the recommendation request for joining in the group; (ii) the group management module of the fried client 400 integrates the group identifier and the user identifier of the local user and submits them to the transceiver module of the friend client 400; and, (iii) the transceiver module of the friend client 400 transmits the recommendation request for joining in the group together with a packet encapsulating the group identifier and the user identifier to the group server 100.

Figure 8:
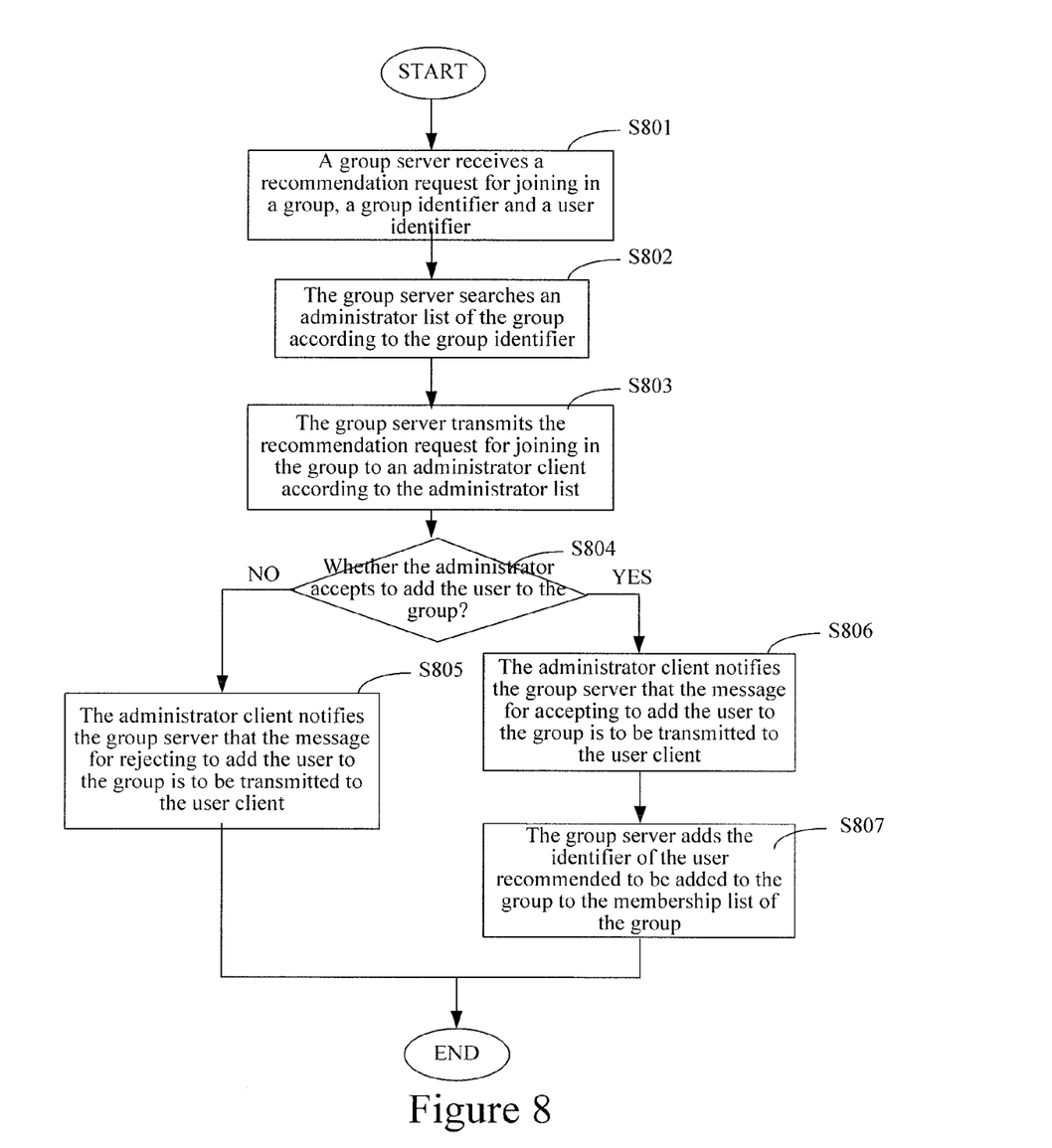

FIG. 8 is a flow chart of the method that the group server 100 processes a recommendation request for joining in a group in an embodiment of the present invention. The specific procedure is as follows:

Step S801: the group server 100 receives a recommendation request for joining in a group, a group identifier and a user identifier.

Step S802: the group server 100 searches for the administrator list of the group according to the group identifier.

The information query module 102 of the group server 100 searches the administrator list of the group in the database 103 according to the received group identifier.

Step S803: the group server 100 transmits the recommendation request for joining in the group to the administrator client 500 according to the administrator list.

The transceiver module 101 of the group server 100 transmits the recommendation request for joining in the group to each administrator client corresponding to the administrator list, e.g., the administrator client 500, encapsulates the group identifier and the user identifier into a packet and transmits the packet to the administrator client 500.

Step S804: it is judged whether the administrator client 500 accepts to add the user to the group, if it accepts, Step S806 is executed, and otherwise, Step S805 is executed.

The transceiver module of the administrator client 500 receives the recommendation request for joining in the group, analyzes the packet to retrieve the group identifier and the user identifier, and displays an interface of a message for the user recommending the fried to be added to the group for the verification of the user as the administrator through the group management module. For example, display a message such as "User * recommends his friend * to be added to the *** group" and provides options of "Accept" or "Reject" for the administrator's selection, and if the user as the administrator selects "Accept", Step S806 is executed, and if he selects "Reject", Step S805 is executed.

Step S805: the administrator client 500 notifies the group server 100 that a message for rejecting to add a user to the group is to be transmitted to the user client 300.

When the user as the administrator rejects to add the friend recommended by a member of a group to the group, he will notify the group server 100 that the message for rejecting to add a user to the group is to be transmitted to the user client 300, the user client 300 may receive a message such as "The administrator user * rejects to add you to the * group" or "The administrator user * rejects to add the friend * you recommended to the *** group".

Step S806: the administrator client 500 notifies the group server 100 that a message for accepting to add a user to a group is to be transmitted to the user client 300.

When the user as the administrator accepts to add the friend recommended by a member of a group to the group, he will notify the group server 100 that the message for accepting to add a user to the group is to be transmitted to the user client 300, the user client 300 may receive a message such as "The administrator user * accepts to add you to the * group" or "The administrator user * accepts to add the friend * you recommended to the *** group".

Step S807: the group server 100 adds the user identifier of the user being recommended to be added to the user to the membership list of the group.

It should be noted that typical application scenarios of the solution of the present invention include Instant Messenger, Online Game and Network Forum, but are not limited to these cases, it may be applicable to other similar network environments.

It should be understood that the forgoing is merely preferred embodiments of the present invention, and is in no way intended to limit the scope of the present invention. Any modifications, equivalents, improvements and the like made within the spirit and principle of the present invention should be encompassed in the scope of the present invention.

The invention claimed is:

1. A group communication system, comprising a group server and a plurality of clients, wherein, a first client among the plurality of clients generates a request for recommending a first user of the first client to be added to a first group, receives characters of the first group inputted by the first user, and transmits to a second client among the plurality of clients the characters of the first group and the request for recommending the first user to be added to the first group;

the first client receives from a third client among the plurality of clients characters of a second group inputted by a second user of the third client and a first request for recommending the second user to be added to the second group, searches for the second group matching to the characters of the second group received from the third client, generates a second request for recommending the second user to be added to the second group, and transmits to the group server the second request for recommending the second user to be added to the second group, an identifier of the second group searched out and an identifier of the second user; and the group server receives the second request for recommending the second user to be added to the second group, the group server searching for the identifier of the second group, and the identifier of the second user, and adds the second user to the second group in response to the second request for recommending the second user to be added to the second group;

generates a request for recommending a third user of a fourth client to be added to a third group, wherein the third user is selected to be recommended to be added to the third group by a local user;

transmits to the fourth client of the third user the request for recommending the third user to be added to the third group and an identifier of the third group;

receives from a fifth client a first request for recommending the local user to be added to a fourth group and an identifier of the fourth group, and determines whether to join in the fourth group; and, generates a second request for recommending the local user to be added to the fourth group, transmitting to the group server the second request for recommending the local user to be added to the fourth group, an identifier of the local user, and the identifier of the fourth group.

2. The system of claim 1, wherein, the group server searches out an administrator list of the second group, transmits the second request for recommending the second user to a client of an administrator according to the administrator list, and determines whether to add the identifier of the second user to a membership list of the second group according to whether the client of the administrator accepts to add the second user to the second group.

3. A client, configured to implement a method comprising:

generating a request for recommending a first user of the client to be added to a first group;

receiving characters of the first group inputted by the first user;

transmitting to a second client the characters of the first group inputted by the first user and the request for recommending the first user to be added to the first group;

receiving characters of a second group inputted by a second user of a third client and a first request for recommending the second user to be added to the second group from the third client of the second user;

searching for the second group matching to the characters of the second group;

generating a second request for recommending the second user to be added to the second group, and transmitting the second request for recommending the second user to be added to the second group, and searching for an identifier of the second group and an identifier of the second user;

generating a request for recommending a third user of a fourth client to be added to a third group, wherein the third user is selected to be recommended to be added to the third group by a local user;

transmitting to the fourth client of the third user the request for recommending the third user to be added to the third group and an identifier of the third group;

receiving from a fifth client a first request for recommending the local user to be added to a fourth group and an identifier of the fourth group, determining whether to join in the fourth group; and generating a second request for recommending the local user to be added to the fourth group, transmitting to a group server the second request for recommending the local user to be added to the fourth group, an identifier of the local user, and the identifier of the fourth group.

4. A method for joining in a group, comprising:

generating a request for recommending a first user of a first client to be added to a first group;

receiving characters of the first group inputted by the first user;

transmitting to a second client the characters of the first group inputted by the first user and the request for recommending the first user to be added to the first group;

receiving characters of a second group inputted by a second user of a third client and a first request for recommending the second user to be added to the second group from the third client of the second user;

searching for the second group matching to the characters of the second group;

generating a second request for recommending the second user to be added to the second group, and transmitting the second request for recommending the second user to be added to the second group, and searching for an identifier of the second group and an identifier of the second user;

generating a request for recommending a third user of a fourth client to be added to a third group, wherein the third user is selected to be recommended to be added to the third group by a local user;

transmitting to the fourth client of the third user the request for recommending the third user to be added to the third group and an identifier of the third group;

receiving from a fifth client a first request for recommending the local user to be added to a fourth group and an identifier of the fourth group, determining whether to join in the fourth group; and generating a second request for recommending the local user to be added to the fourth group, transmitting to a group server the second request for recommending the local user to be added to the fourth group, an identifier of the local user, and the identifier of the fourth group.

5. The method of claim 4, further comprising:

searching, by the group server, an administrator list of the first group according to the request for recommending the first user to be added to the first group, transmitting the request for recommending the first user to a client of an administrator according to the administrator list, and determining whether to add to a membership list of the first group an identifier of the first user according to whether the client of the administrator accepts to add the first user to the first group.

* * * * *